US011812090B2

(12) United States Patent
Aggarwal et al.

(10) Patent No.: US 11,812,090 B2
(45) Date of Patent: Nov. 7, 2023

(54) SYSTEM AND METHOD FOR SOCIAL MULTI-PLATFORM MEDIA PLAYBACK SYNCHRONIZATION

(71) Applicant: Caavo Inc, Milpitas, CA (US)

(72) Inventors: Ashish D. Aggarwal, Stevenson Ranch, CA (US); Andrew E. Einaudi, San Francisco, CA (US)

(73) Assignee: Caavo Inc, Milpitas, CA (US)

( * ) Notice: Subject to any disclaimer, the term of this patent is extended or adjusted under 35 U.S.C. 154(b) by 126 days.

(21) Appl. No.: 17/226,546

(22) Filed: Apr. 9, 2021

(65) Prior Publication Data

US 2021/0321159 A1 Oct. 14, 2021

Related U.S. Application Data

(60) Provisional application No. 63/007,687, filed on Apr. 9, 2020.

(51) Int. Cl.
*H04N 21/43* (2011.01)
*H04N 21/8547* (2011.01)
*H04N 21/6543* (2011.01)

(52) U.S. Cl.
CPC ... *H04N 21/43076* (2020.08); *H04N 21/6543* (2013.01); *H04N 21/8547* (2013.01)

(58) Field of Classification Search
CPC ......... H04N 21/43076; H04N 21/6543; H04N 21/8547
See application file for complete search history.

(56) References Cited

U.S. PATENT DOCUMENTS

| | | | | |
|---|---|---|---|---|
| 2011/0246908 | A1* | 10/2011 | Akram | H04N 21/4788 715/752 |
| 2015/0089372 | A1* | 3/2015 | Mandalia | H04L 67/12 715/720 |
| 2016/0142749 | A1* | 5/2016 | Francis | H04N 21/242 725/37 |
| 2017/0041658 | A1* | 2/2017 | Mattingly | H04N 21/4312 |

* cited by examiner

*Primary Examiner* — Kyu Chae
(74) *Attorney, Agent, or Firm* — WEAVER IP L.L.C.

(57) ABSTRACT

Embodiments and techniques described herein advantageously permit multiple users in disparate physical locations, using different devices and media content providers, to each initiate playback of selected media content, and to continuously temporally synchronize each playback with every other playback through analysis of the information corresponding to each playback (e.g., audio recording of the playback, information corresponding to the video playback and/or closed captioning information).

20 Claims, 6 Drawing Sheets

SYSTEM AND METHOD FOR SOCIAL MULTI-PLATFORM MEDIA PLAYBACK SYNCHRONIZATION

CROSS-REFERENCE TO RELATED APPLICATIONS

This application claims priority to U.S. Provisional Patent Application 63/007,687, filed Apr. 9, 2020, the entirety of which is incorporated by reference herein.

BACKGROUND

Technical Field

Embodiments described herein relate to systems and methods for synchronizing the playback of media across different devices and applications.

Background Art

Until relatively recently, methods for delivering media content such as movies, television programs, and videos, to televisions were limited to linear delivery via over-the-air broadcast, cable TV and/or satellite. More recently, however, delivery of such content is increasingly moving to an over-the-top (OTT) model whereby content may be streamed directly to users over the Internet. The Internet has enabled a move away from the traditional content aggregation model offered on a take-it-or-leave-it basis, and a move toward decentralized content delivery whereby consumers have many choices about how and from whom to receive content. For example, there are a number of companies that offer OTT delivery of local television channels as well as premium content produced by companies like HBO, Hulu or Apple. Moreover, instead of such content being delivered to the living room via expensive, proprietary set-top-boxes as was done traditionally, OTT content may be viewed on a television using a relatively inexpensive general-purpose media consumption device such as an Apple TV, Roku or fireTV stick, to name just a few. Indeed, any Internet-connected device capable of video-playback (e.g., smart phones, tablets, PCs) may likewise receive OTT content.

Almost coincident with these shifts in the media consumption marketplace, social media has exploded and become an interactive social outlet and source of entertainment unto itself. Due to being inherently Internet-based, social media platforms enable many forms of collaboration and sharing of interests between friends and family no matter where they may be physically located. Due to the numerous entertainment possibilities enabled by such social media platforms, as well as the ever expanding selection of available OTT media content, consumers may have only a limited amount of time to devote to watching television/videos vs. engaging with friends on social media. Consumers of social media and video content would likely prefer to engage with friends by watching media content together no matter where they may be, and no matter what means each may have for watching.

BRIEF SUMMARY

Methods, systems, and apparatuses are described for social multi-platform media playback synchronization, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
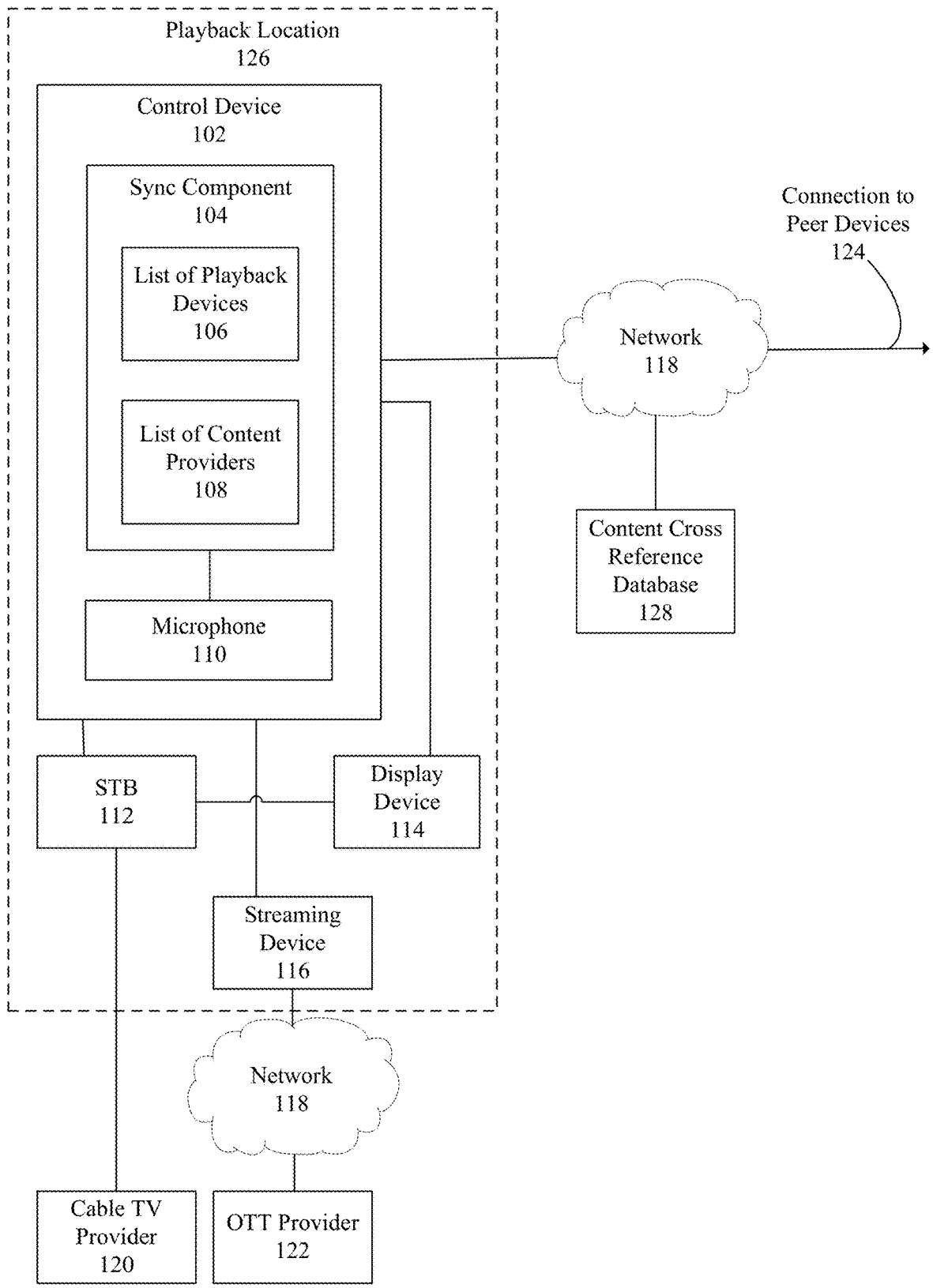
FIG. 1 shows an example client system configured to setup, launch and control a synchronized multi-user, multi-platform shared program viewing session, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

Systems and devices may be configured in various ways to enable a group of users in disparate locations with disparate means for playing media content, to synchronize the playback of the media content for each user with the playback of every other user, according to the techniques and embodiments provided.

The example techniques and embodiments described herein may be adapted to various types of systems and devices, for example but without limitation, communication devices (e.g., cellular and smart phones, etc.), computers/computing devices (e.g., laptops, tablets, desktops, etc.), computing systems, electronic devices, gaming consoles, home electronics and entertainment devices (e.g., home theater systems, stereos, televisions, audio/video (A/V) switching devices, streaming media devices (Roku®, Apple TV®, fire TV®, Nvidia® Shield®, Chromecast®), cable or satellite television set-top-boxes (STBs) etc.), and/or the like. It is contemplated herein that in various embodiments and with respect to the illustrated figures of this disclosure, one or more components described and/or shown may not be included and that additional components may be included.

Embodiments and techniques described herein advantageously provide a group of users with a shared, interactive social media experience coupled with synchronized playback of media content.

Embodiments and techniques described herein can improve the functioning of a system or a device (e.g., a computer, processing device) on which they are implemented. For example, controlling synchronized media reproduction as described herein improves the efficiency of systems and devices associated therewith by managing the playback of the media to use less power (e.g., because less menu browsing and/or manual control of the playback time/speed is required of the user). Additionally, the overall user experience is improved.

Various example embodiments are described in herein. In particular, example social multi-platform media playback synchronization embodiments are described. This description is followed by further example embodiments and advantages. Subsequently an example processing device implementation is described. Finally, some concluding remarks are provided. It is noted that any division of the description herein generally into subsections and/or embodiments is provided for ease of illustration, and it is to be understood that any type of embodiment may be described in any subsection.

Systems and devices may be configured in various ways to perform social multi-platform media playback synchronization, according to the techniques and embodiments provided.

For example, FIG. 1 shows an example client system 100 configured to setup, launch and control a synchronized multi-user, multi-platform shared program viewing session, according to an example embodiment. Client system 100 of FIG. 1 includes a control device 102, a network 118, a streaming device 116, a set-top-box (STB) 112, a display device 114, a cable TV provider 120, an over-the-top (OTT) provider 122 and a content cross reference database 128. Control device 102 includes a sync component 104 configured to enable a synchronized multi-user viewing session. Sync component 104 is coupled to microphone 110. Control device 102, STB 112, streaming device 116 and display device 114 collectively are depicted as being located together at playback location 126. For example, control device 102, STB 112, streaming device 116 and display device 114 may all be co-located at or within the same physical or geographic location, such as a room or area within which are located one or more end users of such devices. Control device 102 is operatively coupled to STB 112 and streaming device 116. Control device 102 is further coupled to one or more peer devices 124 (not illustrated) and content cross reference database 128 via network 118, wherein peer devices 124 may comprise additional instances of the devices illustrated at playback location 126, usable by other users to engage in a shared viewing session according to embodiments described herein. STB 112 is further coupled to a cable TV provider 120, and streaming device 116 is further coupled to an OTT provider 122 via network 118. Other structural and operational embodiments will be apparent to persons skilled in the relevant art(s) based on the following discussion regarding playback location 126 as depicted in FIG. 1.

Figure 2:
FIG. 2 shows a collection of mobile device screenshots depicting setup and launch of a synchronized multi-user, multi-platform co-viewing session, according to an example embodiment.

A detailed description of the operation of example client system 100 will now be performed with continued reference to FIG. 2 which depicts a collection of mobile device screenshots depicting setup and launch of a synchronized multi-user, multi-platform co-viewing session, according to an example embodiment. As shown in FIG. 2, screenshots 200 include screenshots 202-228 that depict one example sequence of operations for initiating a synchronized multi-platform playback session involving multiple users while enabling concurrent social interaction. Screenshots 200 were captured on an Android-based mobile device, and reflect an application running thereon. In embodiments, control device 102 of FIG. 1 may comprise an Android-based mobile device with the abovementioned application running thereon. It should be understood, of course, that an Android-based application is but one means of implementing an embodiment of the invention. Applications suitable for implementing other embodiments of the invention may likewise be implemented on other devices and platforms such as, for example, an iOS application suitable for use on an iPhone, iPad or Apple TV. Likewise, embodiments may be implemented directly on one of the example playback devices discussed above, or directly on an LCD, OLED or other type of television display, or on other types of entertainment system devices. For example, embodiments may be implemented on a Caavo Control Center Universal Remote and Home Theater hub. Indeed, virtually any Internet-connected device with a display screen that is capable of accepting user input and recording sound from the playback environment may be used, in embodiments.

Screenshot 202 of screenshots 200 of FIG. 2 reflects the above described requirement that embodiments be connected to a network such as, for example, network 118 of FIG. 1 (for example, the Internet). This requirement is a natural consequence of the fact that embodiments are configured to control media playback devices such as streaming device 116 of FIG. 1 (note, as discussed below, embodiments are also configured to control other types of media playback devices such as satellite/cable STBs).

Screenshot 204 reflects a setup screen of the application that allows the user to specify the playback devices present at, for example, playback location 126 of FIG. 1, where such devices are connected and available for playback. As shown in FIG. 1, control device 102 is coupled to streaming device 116 (for example, via a network connection) which may comprise one of the devices shown in screenshot 204 (e.g., a Roku, FireTV or Apple TV). Embodiments may also, however, auto-detect playback devices that may be present on the network or are otherwise available to play media content locally. Further, although not shown in screenshot 204, embodiments are also capable of being coupled to and controlling other types of content delivery platforms and systems. For example, control device 102 is coupled to STB 112 which is configured to receive linear and/or VOD content delivered OTT, via satellite/cable, or both from cable TV provider 120, and STB 112 may be included in the devices shown on example screenshot 204. In yet another embodiment, the devices enumerated on screenshot 204 may include the device on which the application itself is running or in this example embodiment, an Android-based mobile device. Alternatively, control device 102, streaming device 116 and display device 114 may all be incorporated into the same device such as, for example, a smart TV. Sync component 104 of control device 102 maintains a list of playback devices 106 that reflects those shown in screenshot 204.

Screenshot 206 displays an enumerated list of content provider services that are available to play programs locally. This enumeration of content provider services reflects manual input of the user whereby the user specifies services to which he/she subscribes. In an alternative embodiment, applications corresponding to content provider services (e.g., the Netflix application or an HBO GO application) may be automatically detected on each of the devices enumerated in screenshot 204, and a UI similar to that of screenshot 206 may instead seek confirmation that the user indeed has a subscription to such detected services (e.g., since just because the Netflix application is installed on a given device does not mean the user subscribes to Netflix, and that programs are therefore viewable with that application). In the context of FIG. 1, screenshot 206 may include cable TV provider 120 and/or OTT provider 122. As with the playback devices, sync component 104 of control device 102 includes a list of the content providers (and applications that may be associated therewith).

Control device 102 is coupled via network 118 to peer devices 124. Peer devices 124 are instances of control device 102 being used by others, and that are configured to enable social media-like capabilities as reflected in screenshots 208-214 of an example embodiment. In particular, screenshots 208 and 210 depict UI that enables the user of control device 102 to turn on notifications (in screenshot 208), and to confirm such enablement (in screenshot 210). Such notifications enable the user to be alerted when their friends (each of whom is using one of peer devices 124 of FIG. 1) wish to invite the user to a synchronized viewing session. Screenshot 212 depicts a typical social customization feature whereby a user may add a photo of themselves to be more easily recognized by their friends and colleagues when interacting online. Lastly, screenshot 214 depicts UI that enables a user to invite her friends to connect in the application. In embodiments, candidate friends may be determined by an import of friend lists from other social media platforms (e.g., Facebook or LinkedIn), or alternatively by scanning the user's email contacts list.

Once users have completed the setup steps generally reflected by screenshots 202-214, a user may elect to use control device 102 start a synchronized playback session and interact with some of his or her friends as generally shown in screenshots 216-228. Start of a session begins with the selection of a program that a user wishes to watch with her friends as shown in screenshot 216 which depicts a search dialog that permits the user to search a program catalog for a program of interest. For example, sync component 104 of FIG. 1 may use the list of content providers 108 to construct a catalog of available programs, and provide search dialog UI to the user as shown in screenshot 216 of FIG. 2. That is, embodiments may populate the catalog of available programs using guide data and/or program catalogs associated with each service provider, and permit users to perform just one search against a centralized content library. Alternatively, embodiments may present friend-based recommendations instead of or in addition to search results.

Suppose now that the user searched for and found "Incredibles 2" using the UI shown in screenshot 216, and wishes to start a shared playback session to watch the movie with friends. Using control device 102, the user may designate which of the list of playback devices 106 is to be used by sync component 104 to play the movie. For example, embodiments may display a UI like that shown in screenshot 218 wherein the user may specify which of their enumerated devices and/or content provider services they wish to use to watch the program locally by clicking "Watch On . . . " in the UI. Where there is only one option for that user (e.g., the user only has an Apple TV, and only subscribes to Netflix), then the UI may reflect such by displaying UI that says simply "Watch on Netflix."

After selecting the playback device and/or content service provider, control device 102 may provide UI that allows the user to select friends she would like to invite to share a movie. For example, screenshot 220 depicts UI that permits the user to select friends from her friend list. In embodiments, the available friends list displayed in the UI may automatically be filtered based on the viewing capabilities of that particular friend. That is, embodiments may only allow a user to invite friends that have access to a content provider service that offers the selected program. Alternatively, embodiments may permit the user to send an invitation to any of her friends without regard for their ability to watch the program so that friend will not feel excluded, and/or to enable embodiments to market OTT playback services to such friends. Although not shown, invitations to friends may specify a particular time and day for the viewing party (i.e., the synchronized shared viewing session enabled by embodiments). After selecting friends to invite, the user may click on a UI button "Send Invites" as shown in screenshot 220.

In embodiments, an invitation sent to a friend does not merely reference the name of the selected program (e.g., 'Incredibles 2'), and instead the invitation also may include one or more content IDs or other identifiers that correspond to the selected program as offered by content service provider(s) available to the invitee. That is, suppose that the selected program (i.e., 'Incredibles 2') is available for playback by the invitor only via Netflix, whereas that program is available for playback by an invitee only via Hulu. In such instances, embodiments may use the Netflix-specific content ID to query content cross reference database 128 for a content description and/or the Hulu-specific content ID for the selected program, and such information included in the invitation sent to the invitee.

After invitations are sent, embodiments of control device 102 are configured to begin the shared viewing session (either immediately, or at the previously agreed upon time and date). Sync component 104 of control device 102 performs the synchronization and may cause appropriate UI to be displayed. For example, screenshot 222 depicts a UI displayed when people are joining the shared viewing session as the program start counts down. At the start time designated in the invitation, and bearing in mind that every participant in the shared viewing session is operating an instance of control device 102 at their location, playback starts at each location.

When playback starts, sync component 104 of control device 102 is configured to synchronize the playback of the program locally with each location corresponding to peer devices 124. In one embodiment, sync component 104 may use microphone 110 to record the sound of the program as it plays, and use that recording, along with recordings made at each of the other locations comprising peer devices 124, to synchronize the playback at all locations. At such times, UI such as that shown in screenshot 224 of FIG. 2 may be displayed for the user. Sync component 104 may analyze the recordings to determine the amount of time that each playback location is out of sync with the others. For example, in one embodiment, the sync component 104 at each playback location may provide the recording of the audio at that location to one or more of the other playback locations to perform a comparison. In another embodiment, and as will be described further herein below, a central server may be configured to receive the sampled audio from all locations, and to determine the relative time delays between each. In either case, the playback location that is the furthest ahead (i.e., all other playback locations are delayed relative to that playback location) will thereafter be designated the Master playback location, and all other playback locations will attempt to alter their playback to sync to the Master playback location. It should be understood, however, that this synchronization process is merely one example embodiment. In other embodiments, and as described further below, a Master playback location need not be the device that is furthest ahead initially and indeed, audio need to be used to achieve synchronization in all embodiments. Instead, each playback location that is capable of determining the playback time (e.g., 12 minutes into the 30 minute program) for itself locally may do so, and only those peer devices that cannot do say may resort to an audio synchronization technique.

Sync component 104 may be configured to determine the relative delays between playback locations in various ways. For example, embodiments may use the sampled audio from two playback locations to calculate a set of cross correlations therefrom at various different delays, wherein the delay that produces the maximum cross correlation is the playback delay between the two playback locations. In other embodiments, however, sync component 104 may be configured to determine the relative delays using other information available during playback. For example, closed captions and/or subtitles tracks that may be included in a program stream may be processed to determine where in the program playback is occurring at any given instant, and such timing information compared to the same information as gathered by sync component 104 of control device 102 at peer devices 124 of other playback locations.

Alternatively, programs being streamed from an OTT provider may be analyzed to determine relative time delays at different playback locations. For example, streamed content may be provided using an adaptable bitrate protocol such as HTTP Live Streaming (HLS) or MPEG-DASH. For such protocols, program content is broken down into short segments typically around 6 to 10 seconds long, and a playlist for such segments is provided to client playback devices. The playback device may parse the playlist to determine the URL associated with each segments, and then retrieve and play the segments back sequentially in a visually seamless manner.

Various different OTT providers and/or playback devices may enable different methods of leveraging the OTT content URLs and/or playlists to determine synchronization information. In some cases, for example, the Master playback location may determine the URL of the segment that is currently or will soon be playing at that location, and communicate that URL to any clients that are capable of using or understanding the URL (e.g., where the client is using the same content service provider, and perhaps connected to the same content delivery network (CDN) node). In this situation, the Master need not glean any time specific information from its playback (i.e., determine the exact time in the playback).

Alternatively, in instances where the URL would be useless to a client (i.e., where the client is playing the content from a different service provider or locally from a DVR), the Master may nevertheless leverage the URL when the URL itself includes a timestamp or other timing information that enables the Master to know where they are in playback. In that case, the Master may extract the timestamp or other timing information and provide same to a client.

It may be the case, however, that the Master 1) cannot determine the URL of the current segment, or 2) the URL is useless to the client and the URL does NOT reflect timestamp information (and hence playback position cannot be determined from the URL). In such situations, and for certain operating configurations, embodiments may query the underlying media player for timing information. For example, suppose the Master is playing HTML5 video content on a PC through the Chrome web browser. In such a situation, embodiments may hook into and query the videoPlayer object of the page DOM for the currentTime. Such timing information may then be passed to client machines that may attempt to sync playback to that time. Such URLs may include a timestamp or otherwise include sequence information permitting sync component 104 to know where the program is at in playback (at least within a time window equal to the segment length).

In another embodiment, sync component 104 of control device 102 may analyze video instead of (or in addition to) audio to determine relative time delays between playback locations. For example, the video signal may be captured and analyzed to determine various characteristics that may be matched between the playback streams. For example, embodiments may be configured to detect black screen transitions and compare the time of each at different playback locations. Alternatively, video may be processed to determine an average brightness for each frame and/or an average brightness over some predetermined period of time (e.g., 1 second). Time series of such averages may then be compared in a manner similar to that of audio as described above to determine the relative delays between playback streams.

Instead of processing the video directly, other embodiments may use sensors to gather video information for processing. In one embodiment, a camera may be pointed at the playback device, and a recording made of the screen with the recording processed to permit comparison between other such recordings made at other locations. Alternatively, an ambient light sensor included on a mobile device may be put in close proximity with the playback screen, and capture ambient light readings that may reflect the changes in scene brightness during playback. The time series of such brightness changes may be compared and relative delays computed in the manner described above with respect to audio.

Having determined the relative playback delays between the master location and all other playback locations, embodiments of sync component 104 of control device 102 at each location may thereafter speed up or slow down their playback to better synchronize its playback with the master location (and as result, with all other locations). In particular, embodiments of sync component 104 of control device 102 may transmit trick-play commands to the playback devices (e.g., STB 112 or streaming device 116), whereby such commands instruct the device to fast forward by a certain amount of time, or to pause playback for a certain period of time. Embodiments are enabled to directly control the trick-play capabilities of the playback device being employed. For example, embodiments may directly connect to and control the device over the local network and using control API that may be available. Alternatively, control device 102 may be coupled to one or more IR blasters (not shown) to control playback devices through their remote control receiver as if control device 102 were just an ordinary remote control.

Having established a synchronized viewing session, control device 102 may provide an interactive social environment allowing users to communicate. For example, embodiments may provide UI such as that shown in screenshots 226 and 228 of FIG. 2 which permit the users to chat while the movie is being played back on display device 114 of FIG. 1.

Figure 3:
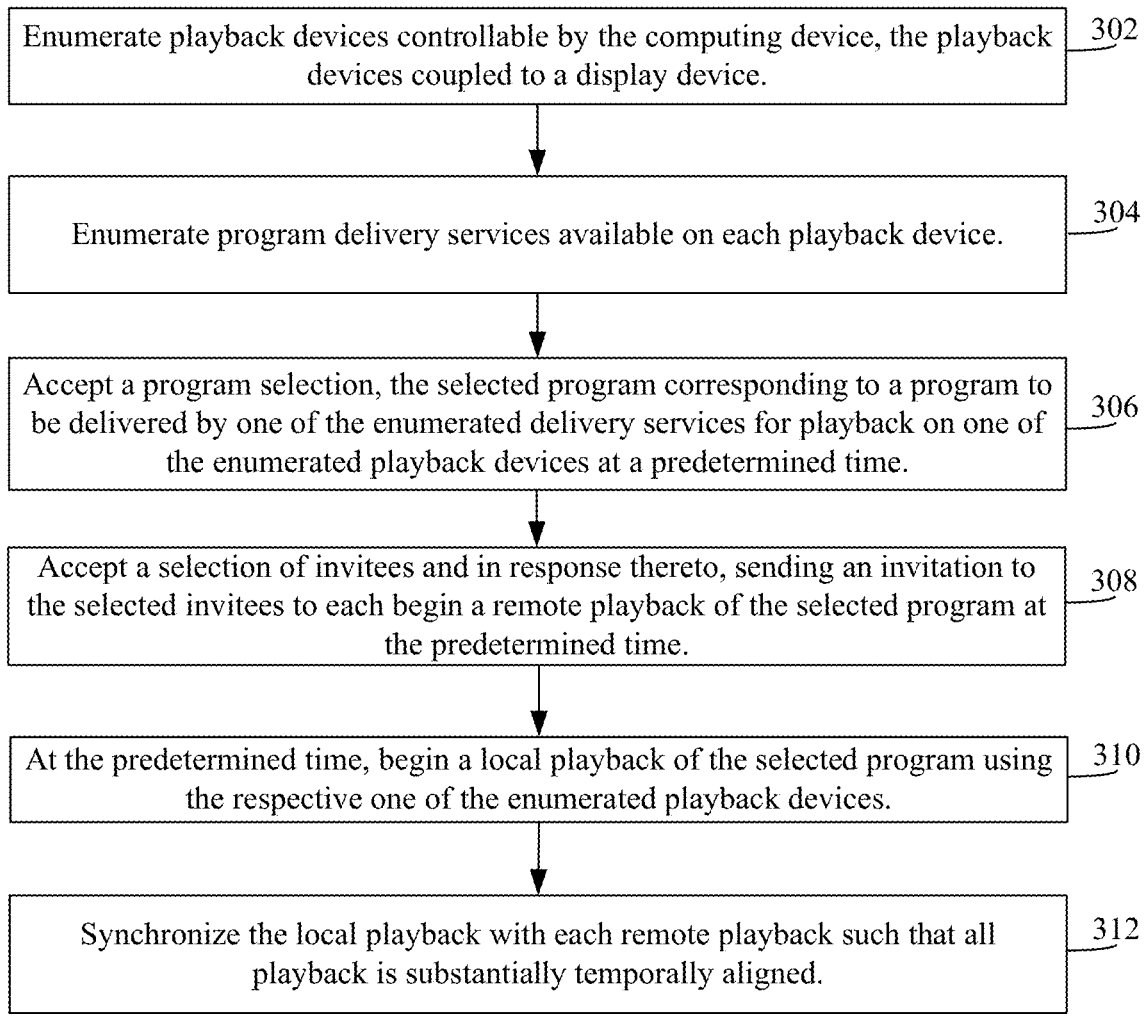
FIG. 3 shows a flowchart of a method for launching and synchronizing a multi-user, multi-platform co-viewing session, according to an example embodiment.

Turning now to FIG. 3, FIG. 3 depicts a flowchart 300 an example method for launching and synchronizing a multi-user, multi-platform co-viewing session, according to an example embodiment. The method of flowchart 300 will now be described with continued reference to FIGS. 1 and 2, although flowchart 300 is not limited to the implementation depicted therein.

As shown in FIG. 3, the method of flowchart 300 begins at step 302, in which playback devices controllable by the computing device are enumerated, wherein the playback devices are coupled to a display device. For example, with reference to FIGS. 1 and 2, sync component 104 of control device 102 may be configured to accept input from the user indicating the devices that are available locally for playback, or may auto-detect such devices, as reflected in the list of playback devices 106 in sync component 104, and as may be displayed at shown in screenshot 204 of FIG. 2.

At step 304, program delivery services available on each playback device are enumerated. For example, with reference to FIGS. 1 and 2, sync component 104 of control device 102 may be configured to accept input from the user indicating the program delivery services (i.e., OTT or cable/satellite TV services), and as reflected in the list of content providers 108 in sync component 104, and as may be displayed at shown in screenshot 206 of FIG. 2.

At step 306, a program selection is accepted, wherein the selected program corresponds to a program to be delivered by one of the enumerated delivery services for playback on one of the enumerated playback devices at a predetermined time. For example, and with continued reference to FIGS. 1 and 2, sync component 104 of control device 102 may be configured to provide a search dialog such as that shown in screenshot 216 of FIG. 2 that allows the user to search for a program to watch. As discussed above, the searchable program catalog may be created based on the programs available on each of content providers in the list of content providers 108, and sync component 104 of control device 102 may accept the user selection of a program after the user has settled on a choice.

At step 308, a selection of invitees is accepted and in response thereto, an invitation is sent to the selected invitees to each begin a remote playback of the selected program at a predetermined time. For example, and with continued reference to FIGS. 1 and 2, sync component 104 of control device 102 may be configured to provide UI such as that shown in screenshot 220 of FIG. 2 whereby a user may select friends to invite to the viewing party, and to subsequently send such invitations.

At step 310, at the predetermined time, local playback of the selected program is started using the respective one of the enumerated playback devices. For example, and with continued reference to FIGS. 1 and 2, sync component 104 of control device 102 may be configured to begin playback of the selected program as described herein above.

Flowchart 300 concludes at step 312. At step 312, local playback is synchronized with each remote playback such that all playback is substantially temporally aligned. For example, and with continued reference to FIG. 1, the sync component 104 of control device 102 at each playback location may gather audio using microphone 110, and perform an analysis comparing the audio gathered at each playback location with one another to determine the relative time delays between playback locations, in the manner described in detail above. After determining such relative delays, the sync component 104 at each location may cause playback at one or more locations to be speed up or slow down to force playback at all locations to be synchronized.

Given the general overview of a synchronization process according to flowchart 300 of FIG. 3, it can be appreciated that such a process may be accomplished in various ways and through various configurations of control devices 102 as shown in FIG. 1. In particular, control device 102 of FIG. 1 may couple to peer devices 124 in numerous ways.

Figure 4:
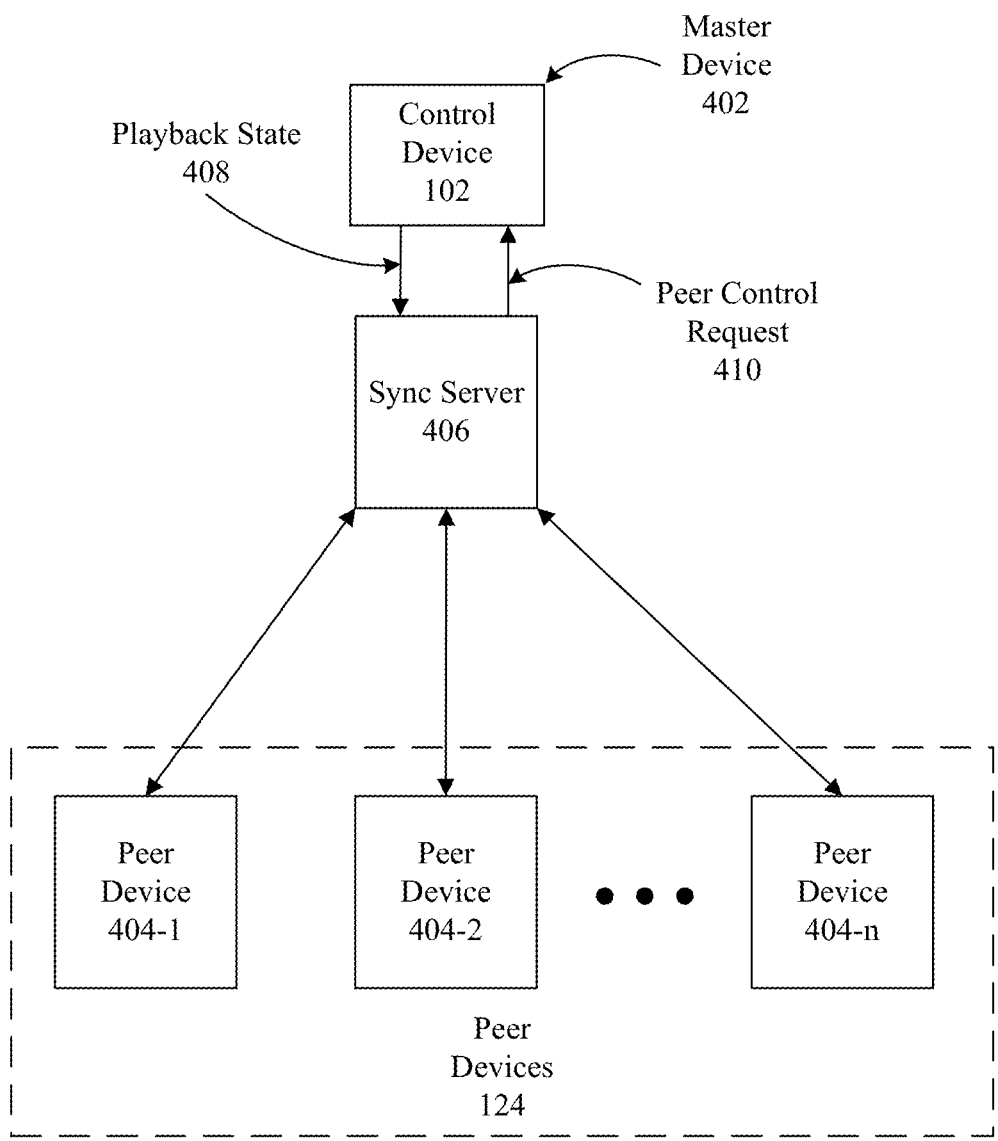
FIG. 4 shows an example master-peer system for setup, launch and control of a synchronized multi-user, multi-platform shared program viewing session, according to an example embodiment.

For example, FIG. 4 shows an example Master-Peer system 400 for setup, launch and control of a synchronized multi-user, multi-platform shared program viewing session, according to an example embodiment. Master-Peer system 400 of FIG. 4 includes master device 402, peer devices 124 and sync server 406. Peer devices 124 include n peer devices 404-1 through 404-n. Master device 402 of Master-Peer system 400 of FIG. 4 may comprise, for example, an instance of control device 102 as described herein above. Other structural and operational embodiments will be apparent to persons skilled in the relevant art(s) based on the following discussion regarding Master-Peer system 400 as depicted in FIG. 4.

A description of the operation of Master-Peer system 400 will now be performed with reference to playback location 126 and control device 102 of FIG. 1, as well as the example operational embodiments described in conjunction therewith and in conjunction with screenshots 200 of FIG. 2. As described above, instances of control device 102 include sync component 104 configured to achieve playback synchronization in various ways. For example, such synchronization may be accomplished by establishing a Master playback location that initiates playback of a program or media selection, and wherein peer devices 124 thereafter attempt to synchronize their respective local playback of that media selection with that of the Master. As also described briefly above, a central server may play a role in helping each playback location determine the relative time delay between their respective local playback and that of the Master playback location. Master-Peer system 400 of FIG. 4 depicts just such an example system wherein sync server 406 may provide synchronization assistance to master device 402 and each of peer devices 124.

Figure 5:
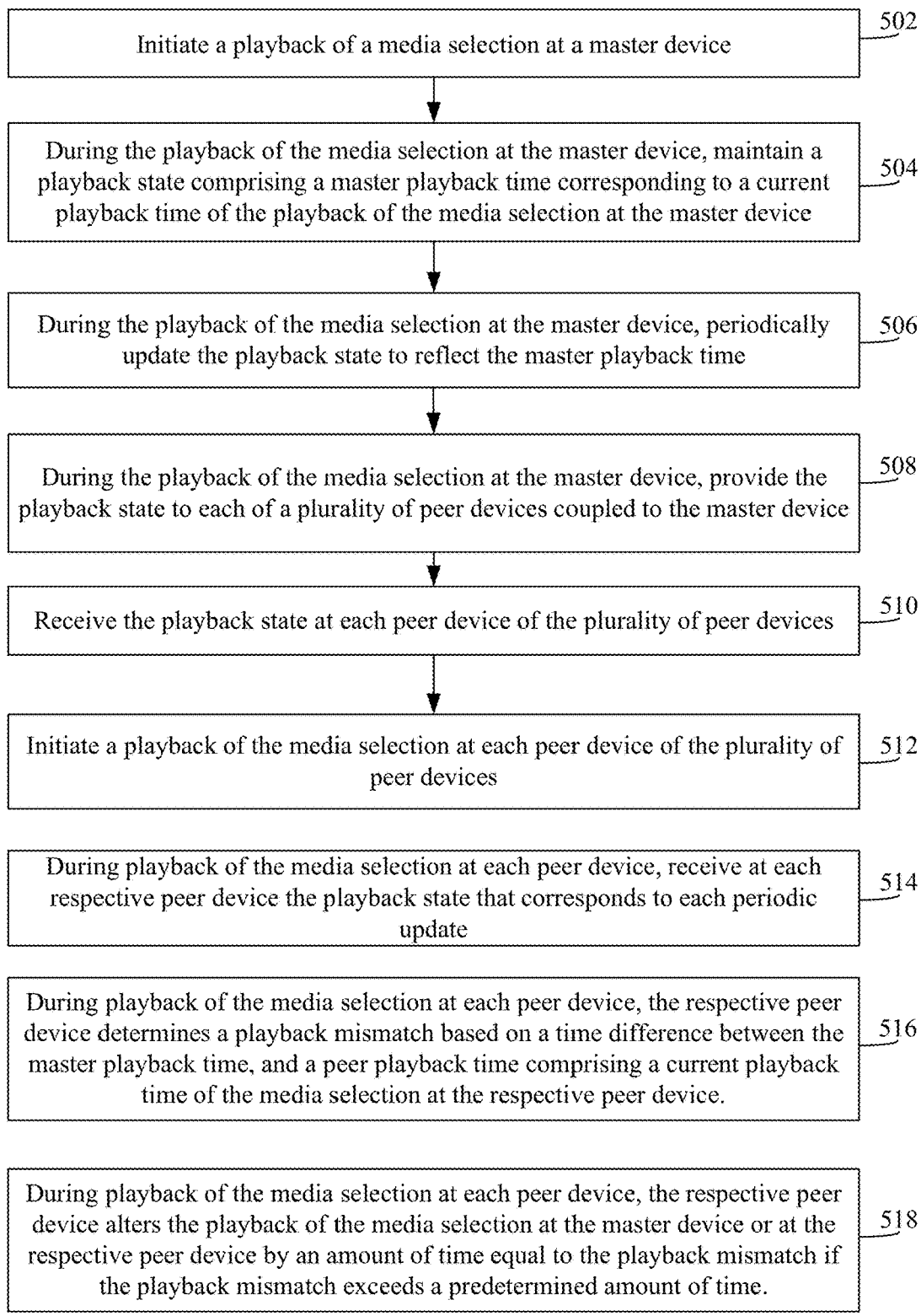
FIG. 5 shows a flowchart of a method for setup, launch and control of a synchronized multi-user, multi-platform shared program viewing session in a master-peer synchronization system, according to an example embodiment.

However, the operation of Master-Peer system 400 is not strictly limited to assisting with synchronization through audio analysis. Indeed, it will often be the case that many of peer devices 124 can determine for themselves the relative playback delay between their respective local playback times and that of the Master device. For example, a peer device of peer devices 124 may be able to determine its own playback time unassisted by one of the methods described herein above (e.g., query the media player that is playing back the media selection), and could determine the playback mismatch if it had knowledge of the playback time of the Master playback location. Master-Peer system 400 takes advantage of this observation by enabling embodiments to perform a method for setup, launch and control of a synchronized multi-user, multi-platform shared program viewing session in a master-peer synchronization system. For example, FIG. 5 shows a flowchart 500 of a method for setup, launch and control of a synchronized multi-user, multi-platform shared program viewing session in a master-peer synchronization system, according to an example embodiment. Accordingly, operation of example embodiment Master-Peer system 400 will now be described in conjunction with flowchart 500 of FIG. 5, and with reference to control device 102 of FIG. 1, and the screenshots depicted in FIG. 2.

As shown in FIG. 5, the method of flowchart 500 begins with step 502. At step 502, playback of a media selection is initiated at a master device. For example, and with continued reference to FIGS. 1, 2 and 4, master device 402 of FIG. 4 comprises an instance of control device 102 of FIG. 1. As described above, a user of master device 402 (i.e., control device 102) may initiate a synchronized playback session with one or more friends starting by making a media selection from amongst programs available to that user, selecting friends and sending them an invitation, and thereafter beginning playback as generally shown, for example, in screenshots 216-222 of FIG. 2. Flowchart 500 continues at step 504.

At step 504, during the playback of the media selection at the master device, a playback state is maintained, the playback state comprising a master playback time corresponding to a current playback time of the playback of the media selection at the master device. For example, and with continued reference to FIGS. 1, 2 and 4, master device 402 is configured to maintain (and periodically transmit to peer devices 124 through sync server 406) playback state 408. More specifically, instead of master device 402 proceeding with an audio-based synchronization as shown in screenshot 224 of FIG. 2, master device 402 instead begins playback at step 502, and then keeps track of its playback state by maintaining playback state 408 in a data structure that is stored in a memory device included in or otherwise accessible to master device 402. For example, the data structure corresponding to the playback state 408 of master device 402 may include the following information: a media selection identifier that corresponds to the media selection (e.g., the title of the movie that the users will watch together), a playback status (e.g., playing, paused, stopped, seeking), a master playback time, an update time and a group list.

The master playback time maintained in playback state 408 reflects the current playback time that is currently being played. For example, when the media selection has been playing for 5 minutes and 32 seconds, the playback time will simply be 5:32. Stated another way, the playback time is just the temporal location in the media selection that is currently being rendered by the media player on master device 402.

Playback state 408 also includes a group list that includes an identifier for each participant on the synchronized viewing, and including IP addresses and other information to enable direct communication between each of master device 402 and peer devices 124. Playback state 408 may be maintained locally either in volatile or non-volatile memory or storage, or may be maintained remotely such as, for example, at sync server 406 of FIG. 4. Flowchart 500 continues at step 506.

At step 506, during the playback of the media selection at the master device, the playback state is periodically updated to reflect the master playback time. For example, and with continued reference to FIGS. 1, 2 and 4, master device 402 is configured to periodically update playback state 408 to reflect the current state of the playback on master device 402, in embodiments. For example, suppose that master device 402 is configured to update playback state 408 every 5 seconds in which case, and assuming the example above where master playback time was 5:32 and master device 402 continued to play the media selection between updates, playback state 408 would be updated to reflect a master playback time of 5:37. When master device 402 performs such an update, the update time of playback state 408 is likewise changed to match the time of day when the update occurred at master device 402. The update time of playback state 408 may be used for multiple purposes as will be described further herein below. Flowchart 500 continues at step 508.

At step 508, during the playback of the media selection at the master device, the playback state is provided to each of a plurality of peer devices coupled to the master device. For example, and with continued reference to FIGS. 1, 2 and 4, master device 402 of FIG. 4 may be configured to provide playback state 408 to sync server 406 which may then provide playback state 408 to each of peer devices 124. As discussed further below, each of peer devices 124 may receive an initial playback state 408 which includes information sufficient for peer devices 124 to begin playback of the media selection locally at each of peer devices 124. Thereafter, sync server 406 may provide each periodic update to playback state 408 to peer devices 124 as such updates are received from master device 402.

Alternatively, sync server 406 may be configured to provide updates less frequently. For example, once initial synchronization between master device 402 and peer devices 124 is established, sync server 406 may not need to provide updated versions of playback state 408 when the only updates to playback state 408 comprise changes in the master playback and update times that are expected to arise naturally during normal playback. For example, where an embodiment of master device 402 is configured perform the periodic updates to playback state 408 every 5 seconds, and where synchronized playback is proceeding normally, then master playback and update times in each update to playback state 408 received at sync server 406 will ordinarily include master playback and update times that differ from the prior update by 5 seconds. In such an instance, master device 402 and/or sync server 406 may send updates to playback state 408 less frequently and peer devices 124 may assume that playback remains synchronized despite less frequent updates. In such embodiments, sync server 406 may be configured to provide the most recently received version of playback state 408 to a peer device of peer devices 124 only when such device requests an update. For example, where a peer device suffers network congestion and as a result their playback buffer empties, that peer device of peer devices 124 will of course know that they have fallen out of sync with master device 402 and may request the current playback state 408 from sync server 406 (or directly from master device 402).

Note, in each of these embodiments described above, master device 402 may instead provide playback state 408 directly to each of peer devices 124 and without going through sync server 406. Embodiments may include and utilize a sync server 406 where master device 402 is incapable of handling such tasks (i.e., where master device 402 is a device with relatively low processing and/or bandwidth capabilities) or where a number of peer devices 124 require the use of audio-based methods for determining the playback mismatch between master device 402 and the respective peer device 124 (e.g., due to insufficient processing capability). In yet another embodiment, some of peer devices 124 may receive playback state 408 from directly from master device 402 whereas others may receive from sync server 406 (e.g., again, depending on compute and/or bandwidth requirements, or geographic proximity. Flowchart 500 continues at step 510.

At step 510, the playback state is received at each peer device of the plurality of peer devices. For example, and with continued reference to FIGS. 1, 2 and 4, as described above, playback state 408 is sent to peer devices 124 from either master device 402 or sync server 406, and received by each of peer devices 124. Flowchart 500 continues at step 512.

At step 512, a playback of the media selection is initiated at each peer device of the plurality of peer devices. For example, and with continued reference to FIGS. 1, 2 and 4, each of peer devices 124 may inspect the initial playback state 408 that was received to determine the media selection identifier, and initiate playback of that selection at the respective peer device 124. In embodiments, the media selection identifier comprises any type of identifier sufficient for each of peer devices 124 to determine where and how to start playback of the media selection. Flowchart 500 continues at step 514.

At step 514, during playback of the media selection at each peer device, each respective peer device receives the playback state that corresponds to each periodic update. For example, and with continued reference to FIGS. 1, 2 and 4, as described herein above in conjunction with steps 504-508 of flowchart 500, master device 402 and/or sync server 406 are configured to provide the periodic updates to playback state 408 to each of peer devices 124 which are subsequently received by such peer devices 124. Flowchart 500 continues at step 516.

At step 516, during playback of the media selection at each peer device, the respective peer device determines a playback mismatch based on a time difference between the master playback time, and a peer playback time comprising a current playback time of the media selection at the respective peer device. For example, and with continued reference to FIGS. 1, 2 and 4, each of peer devices 124 may determine a playback mismatch by comparing the master playback time included in the received playback state 408 with a peer playback time that corresponds to the current playback at that peer device 124. The peer playback time is analogous to the master playback time as described above, except scoped to a peer of peer devices 124 (i.e., is the current playback time of the media selection at that peer device 124). The respective playback times are thereby directly comparable allowing the respective peer device of peer devices 124 to determine the amount of time by which the local playback is out of sync with that of master device 402. More specifically, one may subtract the peer playback time from the master playback time and determine whether the playback at the peer device is ahead of or behind that of master device 402 (i.e., based on the sign of the result), and by how much.

This determination of the playback mismatch may also use the update time of playback state 408 to ensure an accurate determination in the face of excessive latency between master device 402 and sync server 406, sync server 406 and a peer device of peer devices 124 or between master device 402 and a peer device of peer devices 124. More specifically, an update time of playback state 408 that differs from the actual time of day (i.e., the current clock time locally) by more than a predetermined amount (e.g., by more than the amount of time that corresponds to acceptable level of synchronization between master device 402 and peer devices 124) is indicative of such excess latency along the transmission path. This latency can be accounted for in determining the playback mismatch. In particular, the master playback time included in playback state 408 reflects the master playback time as it was in the past, at the update time. Accordingly, the actual present master playback time at master device 402 is ahead of the master playback time included in playback state 408 by an amount equal to the difference between the update time of playback state 408, and the current clock time. Thus, for comparison purposes in determining the playback mismatch, a peer device of peer devices 124 first will determine the actual present master playback time by adding the difference between the update time in playback state 408 and the current clock time to the master playback time in playback state 408. Having thus determined a master playback time corrected for latency, such corrected master playback time may be compared to the peer playback time (i.e., the current playback time of the playback at a given peer) to determine whether that peer is ahead or behind the playback at master device 402, and by what amount. Flowchart 500 concludes at step 518.

At step 518, during playback of the media selection at each peer device, the respective peer device alters the playback of the media selection at the master device or at the respective peer device by an amount of time equal to the playback mismatch if the playback mismatch exceeds a predetermined amount of time. For example, and with continued reference to FIGS. 1, 2 and 4, each peer device of peer devices 124 determines a playback mismatch that indicates whether the playback at the peer device 124 is ahead or behind that of master device 402, and by how much. In embodiments, a peer device 124 with a playback that is running ahead of that of master device 402 may pause the playback at the peer device 124 for the amount of time indicated by the playback mismatch and then resume playback after pausing for the correct amount of time. Alternatively, a peer device of peer devices 124 may be capable of accurately rewinding or resetting the playback time by an amount of time indicated by the playback mismatch. In either case, playback at a peer device 124 should thereafter be closely synchronized with that of master device 402.

In the event that playback at a give peer device of peer devices 124 is running behind the playback at master device 402, the peer device may fast forward by an amount of time indicated by the playback mismatch. If a given peer device of peer devices 124 is incapable of accurately fast forwarding its playback (e.g., due to limitations imposed by the content provider), or if the peer device is simply not capable of fast forwarding, then such a peer device may instead send a peer control request 410 either directly to master device 402, or through sync server 406, wherein the peer control request 410 is a request from the peer that causes the master device 402 pause its playback by an amount of time equal to that of the playback mismatch. All other peers of peer devices 124 will likewise need to pause their respective playbacks for a similar amount time in order for all devices to get or remain synchronized with master device 402. The other peer devices 124 may perform such a pause either in response to an express request from master device 402, sync server 406 or the peer incapable of pausing that the other peers perform the pause, or such a pause will happen naturally in due course when peer devices 124 receive the next update to playback state 408 from master device 402 or sync server 406, and the other peers of peer devices 124 discover that playback is no longer synchronized. In such a circumstance, such peer devices 124 will perform the pause in due course while performing the synchronization steps 514-518 of flowchart 500 of FIG. 5.

As described briefly above, the method 500 of FIG. 5 as described assumes that a given peer of peer devices 124 can learn its own playback time (i.e., determining its peer playback time for itself). The peer playback time may be determined in several ways. For example, and as described above, a peer device of peer devices 124 may determine its own peer playback time based on playback information provided by that peer's media player while performing the playback of the media selection, timing information corresponding to closed captioning or subtitle text included in the media being streamed to and played at the peer or a timestamp or other timing information corresponding to a media segment URL of a media segment currently being played at the peer device.

Alternatively, and also as described previously, the playback mismatch may be determined directly without comparing the master playback time of master device 402 to the peer playback time of a peer device of peer devices 124 by using the audio synchronization technique described herein above. In particular, audio playback samples at each of master device 402 and a peer device of peer devices 124 may be captured and provided to one of sync server 406, master device 402 or the respective peer device of peer devices 124, and a cross correlation of the audio playback sample time series from each location may be determined. The time lag that maximizes the cross correlation is the playback mismatch. After determining the playback mismatch in this manner, the determined playoff mismatch may be transmitted by either master device 402 or sync server 406 back to the respective peer device of peer devices 124 and thereafter used by that peer device in the manner described above in conjunction with steps flowchart 500 of FIG. 5 to resynchronize peer devices 124 with master device 402.

Note that in some embodiments, master device 402 and/or some of peer devices 124 may be capable of capturing a portion of the audio stream of the media selection being streamed (e.g., the audio portion of the typical 10 second long HLS or MPEG-DASH media segment) without the need to capture audio with a microphone. Moreover, some embodiments may be capable of internally sampling the audio being played back (e.g., a personal computer configured to capture audio through a mixer function of an on-board sound card) wherein again master device 402 and/or peer devices 124 need not capture audio using a microphone. The advantage using audio collected by one these methods is that the fidelity of the audio is ensured without the environmental and other noise inherent to audio capture using a microphone, and cross correlation comparison of such audio can be very accurate.

In other embodiments, a cross correlation of other types of time series may likewise be performed to determine the playback mismatch between master device 402 and peer devices 124. For example, instead of capturing audio from the master device 402 or peer devices 124 by one of the methods described above, embodiments may instead form time series from data collected or derived from the video portion of the media selection playback. For example, frames of video may be analyzed to determine the temporal locations of black screen transitions or to determine an average frame brightness for such frames. In either case, time series may be formed from the results of such analysis and a cross correlation determined.

In the foregoing discussion of steps 502-518 of flowchart 500, it should be understood that at times, such steps may be performed in a different order or even contemporaneously with other steps. For example, each of steps 504-508 are performed during playback of the media selection at the master device and as such, these steps could be performed in any order. Likewise, steps 514-518 are each performed during playback of the media selection at each peer device and as such, these steps could be performed in any order any time after the peer device has first received the playback state from the master device. Likewise, the step of altering the playback at step 518 will not be performed so long as the mismatch is less than a certain amount of time. Other operational embodiments will be apparent to persons skilled in the relevant art(s). Note also that the foregoing general description of the operation of Master-Peer system 400 of FIG. 4 is provided for illustration only, and embodiments of Master-Peer system 400 may comprise different hardware and/or software, and may operate in manners different than described above. For example, embodiments may be configured such that master device 402 and each peer device of peer devices 124 communicate directly with one another, and need not communicate through sync server 406.

III. Further Example Embodiments and Advantages

It should be noted that embodiments are contemplated for different types of media and multimedia content and activities, and while some embodiments described above refer to television content, embodiments are not so limited. Embodiments contemplate, without limitation, all forms of streaming media and multimedia content, rentable and pay-per-view content, content from satellite providers, content from internet service/application providers, and/or the like.

In embodiments, one or more of the operations of any flowchart described herein may not be performed. Moreover, operations in addition to or in lieu of any flowchart described herein may be performed. Further, in embodiments, one or more operations of any flowchart described herein may be performed out of order, in an alternate sequence, or partially (or completely) concurrently with each other or with any other operations.

As noted above, systems and devices may be configured in various ways to recommend content, according to the techniques and embodiments provided. For example, embodiments and techniques, including methods, described herein may be performed in various ways such as, but not limited to, being implemented by hardware, or hardware combined with one or both of software and firmware. For example, embodiments may be implemented as systems and devices, such as usage model systems and devices, specifically customized hardware, application-specific integrated circuits (ASICs), electrical circuitry, and/or the like.

The further example embodiments and advantages described in this Section may be applicable to embodiments disclosed in any other Section of this disclosure.

IV. Example Computer Implementations

Various features of systems 100 and 400 of FIGS. 1 and 4, and the steps of flowcharts 300 and 500 of FIGS. 3 and 5, respectively, along with various features of any respective components/subcomponents thereof, and/or any techniques, flowcharts, further systems, sub-systems, and/or components disclosed and contemplated herein may be implemented in hardware (e.g., hardware logic/electrical circuitry), or any combination of hardware with one or both of software (computer program code or instructions configured to be executed in one or more processors or processing devices) and firmware.

Figure 6:
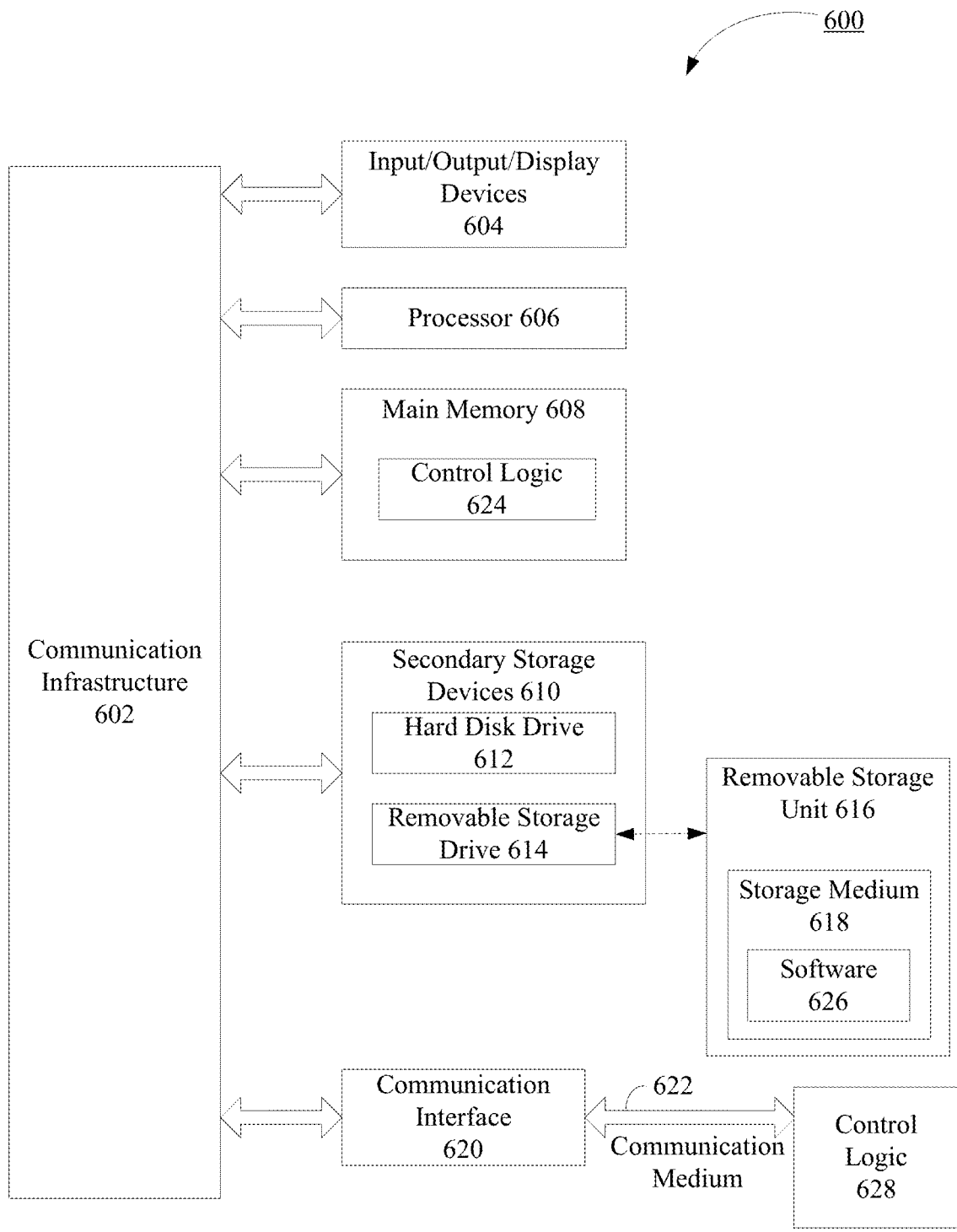
FIG. 6 shows a block diagram of a computing device/system in which the techniques disclosed herein may be performed and the embodiments herein may be utilized.

The embodiments described herein, including circuitry, devices, systems, methods/processes, and/or apparatuses, may be implemented in or using well known processing devices, communication systems, servers, and/or, computers, such as a processing device 600 shown in FIG. 6. It should be noted that processing device 600 may represent communication devices/systems, entertainment systems/devices, processing devices, as well as tablets, laptops and/or traditional computers in one or more embodiments. For example, usage model systems and shared devices according to the described techniques and embodiments, and any of the sub-systems and/or components respectively contained therein and/or associated therewith, may be implemented in or using one or more processing devices 600 and similar computing devices.

Processing device 600 can be any commercially available and well known communication device, processing device, and/or computer capable of performing the functions described herein, such as, but not limited to, devices/computers available from International Business Machines®, Apple®, Sun®, HP®, Dell®, Cray®, Samsung®, Nokia®, etc. Processing device 600 may be any type of computer, including a desktop computer, a server, etc., and may be a computing device or system within another device or system.

Processing device 600 includes one or more processors (also called central processing units, or CPUs), such as a processor 606. Processor 606 is connected to a communication infrastructure 602, such as a communication bus. In some embodiments, processor 606 can simultaneously operate multiple computing threads, and in some embodiments, processor 606 may comprise one or more processors.

Processing device 600 also includes a primary or main memory 608, such as random access memory (RAM). Main memory 608 has stored therein control logic 624 (computer software), and data.

Processing device 600 also includes one or more secondary storage devices 610. Secondary storage devices 610 include, for example, a hard disk drive 612 and/or a removable storage device or drive 614, as well as other types of storage devices, such as memory cards and memory sticks. For instance, processing device 600 may include an industry standard interface, such a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 may interact with a removable storage unit 616. Removable storage unit 616 includes a computer useable or readable storage medium 618 having stored therein computer software 626 (control logic) and/or data. Removable storage unit 616 represents a floppy disk, magnetic tape, compact disk, DVD, optical storage disk, or any other computer data storage device. Removable storage drive 614 reads from and/or writes to removable storage unit 616 in a well-known manner.

Processing device 600 also includes input/output/display devices 604, such as touchscreens, LED and LCD displays, monitors, keyboards, pointing devices, etc.

Processing device 600 further includes a communication or network interface 620. Communication interface 620 enables processing device 600 to communicate with remote devices. For example, communication interface 620 allows processing device 600 to communicate over communication networks or mediums 622 (representing a form of a computer useable or readable medium), such as LANs, WANs, the Internet, etc. Communication interface 620 may interface with remote sites or networks via wired or wireless connections.

Control logic 628 may be transmitted to and from processing device 600 via the communication medium 622.

Any apparatus or manufacture comprising a computer useable or readable medium having control logic (software) stored therein is referred to herein as a computer program product or program storage device. This includes, but is not limited to, processing device 600, main memory 608, secondary storage devices 610, and removable storage unit 616. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 6) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 606 of FIG. 6), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A media playback synchronization method, the method comprising:
    receiving playback state at a peer device, the playback state comprising a master playback time corresponding to a playback of a media selection at a master device;
    initiating a playback of the media selection at the peer device; and
    during the playback of the media selection at the peer device:
        responsive to a playback buffer of the peer device being emptied, transmit, by the peer device, a request for a playback state of the master device to the master device;
        receiving an update to the playback state from the master device;
        determining a playback mismatch based on a time difference between the master playback time and a peer playback time comprising a current playback time of the media selection at the peer device, and
        altering the playback of the media selection at the master device or at the peer device by an amount of time equal to the playback mismatch if the playback mismatch exceeds a predetermined amount of time.

2. The media playback synchronization method of claim 1, further comprising:
    receiving the playback state from the master device at a synchronization server through which the master device is coupled to the peer device; and
    providing the received playback state to the peer device.

3. The media playback synchronization method of claim 2, further comprising:
    determining the playback mismatch at one of the synchronization server, the master device or the peer device by determining a cross correlation of a first time series and a second time series, wherein:
        the first time series corresponds to the playback of the media selection on the master device,
        the second time series corresponds to the playback of the media selection on the peer device, and
        the playback mismatch corresponds to a time lag that maximizes the cross correlation.

4. The media playback synchronization method of claim 1, wherein altering the playback of the media selection at the master device or at the peer device by an amount of time equal to the playback mismatch comprises:
    rewinding or pausing the playback of the media selection at the peer device by an amount of time equal to the playback mismatch when the playback mismatch indicates that the playback of the media selection at the peer device is ahead of the playback of the media selection at the master device; and
    fast forwarding the playback of the media selection at the peer device by an amount of time equal to the playback mismatch, or by causing the playback of the media selection on the master device to be paused for an amount of time equal to the playback mismatch, each when the playback mismatch indicates that the playback of the media selection at the peer device is behind the playback of the media selection at the master device.

5. The media playback synchronization method of claim 1, wherein the playback state further comprises an update time corresponding to a time of a most recent periodic update to the playback state received from the master device, the method further comprising:
    determining the playback mismatch to be a sum of the master playback time, and a difference between the update time and a current time.

6. The media playback synchronization method of claim 1, further comprising:
    determining the peer playback time at the peer device based on at least one of:

playback information provided by a media player while performing the playback of the media selection at the peer device;

timing information corresponding to closed captioning or subtitle text of the playback of the media selection at the peer device; or a timestamp or other timing information corresponding to a media segment URL of a media segment currently being played at the peer device.

7. The media playback synchronization method of claim 3, wherein the first time series and the second time series, respectively, are generated based on at least one of:

audio sampled from the respective playback;

black screen transitions determined from frames of video of the respective playback;

average frame brightness determined from frames of video of the respective playback; or ambient light readings sampled by a sensor placed in proximity to a playback screen on which the selected media is being played.

8. The media playback synchronization method of claim 1, wherein the playback state further comprises a master playback status and the method further comprises:

causing at the peer device a local playback status of the peer device to match the master playback status of the playback state.

9. The media playback synchronization method of claim 8, wherein each of the master playback status and the local playback status comprise one of playing, paused and stopped.

10. A media playback synchronization system, comprising:

a peer device for synchronizing playback of a media selection at the peer device with a playback of the media selection at a master device, the peer device configured, to:

receive a playback state comprising a master playback time from the master device, the playback state corresponding to the playback of the media selection at the master device;

initiate playback of the media selection;

periodically receive an update to the playback state from the master device;

determine a playback mismatch based on a time difference between the master playback time, and a peer playback time comprising a current playback time of the media selection at the peer device, wherein the playback mismatch is determined by:

determining a cross correlation of a first time series and a second time series, wherein:

the first time series is generated based at least on an analysis of ambient light readings sampled by a sensor placed in proximity to a playback screen on which the media selection on the master device is being played, the second time series is generated based at least on an analysis of ambient light readings sampled by a sensor placed in proximity to a playback screen on which the media selection on the peer device is being played, and the playback mismatch corresponds to a time lag that maximizes the cross correlation; and if the playback mismatch exceeds a predetermined amount of time, then alter the playback of the media selection at the master device or at the peer device until a subsequently determined playback mismatch is less than the predetermined amount of time.

11. The media playback synchronization system of claim 10, wherein the master device is coupled to the peer device through a synchronization server, wherein the synchronization server is configured to:

receive the playback state from the master device; and provide the playback state to the peer device.

12. The media playback synchronization system of claim 11, wherein the synchronization server or the master device is configured to determine the playback mismatch on behalf of the peer device.

13. The media playback synchronization system of claim 10, wherein:

the first time series is generated based further on at least one of:

audio sampled from the playback of the media selection on the master device;

black screen transitions determined from frames of video of the playback of the media selection on the master device; or average frame brightness determined from frames of video of the playback of the media selection on the master device;

and the second time series is generated based further on at least one of:

audio sampled from the playback of the media selection on the peer device;

black screen transitions determined from frames of video of the playback of the media selection on the peer device; or average frame brightness determined from frames of video of the playback of the media selection on the peer device.

14. The media playback synchronization system of claim 10, wherein the peer device is further configured to alter the playback of the media selection at the master device or at the peer device by:

rewinding or pausing the playback of the media selection at the peer device by an amount of time equal to the playback mismatch when the playback mismatch indicates that the playback of the media selection at the peer device is ahead of the playback of the media selection at the master device; and fast forwarding the playback of the media selection at the peer device by an amount of time equal to the playback mismatch, or by causing the playback of the media selection on the master device to be paused for an amount of time equal to the playback mismatch, each when the playback mismatch indicates that the playback of the media selection at the peer device is behind the playback of the media selection at the master device.

15. The media playback synchronization system of claim 10, wherein the peer device is further configured to determine the peer playback time based on at least one of:

playback information provided by a media player while performing the playback of the media selection at the peer device;

timing information corresponding to closed captioning or subtitle text of the playback of the media selection at the peer device; or from a timestamp or other timing information corresponding to a media segment URL of a media segment currently being played at the peer device.

16. A method in a peer device for synchronizing playback of a media selection at the peer device with a playback of the media selection at a master device, the method comprising:

receiving a playback state comprising a master playback time from the master device, the playback state corresponding to the playback of the media selection at the master device;

initiating playback of the media selection;

periodically receiving an update to the playback state from the master device;

determining a playback mismatch based on a time difference between the master playback time, and a peer playback time comprising a current playback time of the playback of the media selection at the peer device, wherein determining the playback mismatch comprises:

determining a cross correlation of a first time series and a second time series, wherein:

the first time series is generated based at least on an analysis of frames of video of the playback of the media selection on the master device, the second time series is generated based at least on an analysis of frames of video of the playback of the media selection on the peer device, and the playback mismatch corresponds to a time lag that maximizes the cross correlation; and causing the playback of the media selection at the master device or at the peer device to be altered by an amount of time equal to the playback mismatch if the playback mismatch exceeds a predetermined amount of time.

17. The method of claim 16, wherein causing the playback of the media selection at the master device or at the peer device to be altered by an amount of time equal to the playback mismatch comprises:

rewinding or pausing the playback of the media selection at the peer device by an amount of time equal to the playback mismatch when the playback mismatch indicates that the playback of the media selection at the peer device is ahead of the playback of the media selection at the master device; and fast forwarding the playback of the media selection at the peer device by an amount of time equal to the playback mismatch, or by causing the playback of the media selection on the master device to be paused for an amount of time equal to the playback mismatch, each when the playback mismatch indicates that the playback of the media selection at the peer device is behind the playback of the media selection at the master device.

18. The method of claim 16, further comprising determining the peer playback time based on at least one of:

playback information provided by a media player of the peer device while performing the playback of the media selection;

timing information corresponding to closed captioning or subtitle text of the playback of the media selection at the peer device; or a timestamp or other timing information corresponding to a media segment URL of a media segment currently being played at the peer device.

19. The method of claim 16, wherein:

the first time series is generated based further on at least one of:

audio sampled from the playback of the media selection on the master device; or ambient light readings sampled by a sensor placed in proximity to a playback screen on which the media selection on the master device is being played; and the second time series is generated based further on at least one of:

audio sampled from the playback of the media selection on the peer device; or ambient light readings sampled by a sensor placed in proximity to a playback screen on which the media selection on the peer device is being played.

20. The method of claim 16, wherein:

the analysis of frames of video of the playback of the media selection on the master device comprises at least one:

analyzing black screen transitions determined from frames of video of the playback of the media selection on the master device; or analyzing average frame brightness determined from frames of video of the playback of the media selection on the master device; and the analysis of frames of video of the playback of the media selection on the peer device comprises at least one:

analyzing black screen transitions determined from frames of video of the playback of the media selection on the peer device; or analyzing average frame brightness determined from frames of video of the playback of the media selection on the peer device.

* * * * *